United States Patent
Boileau et al.

(10) Patent No.: US 12,110,843 B2
(45) Date of Patent: Oct. 8, 2024

(54) THRUST REVERSER COMPRISING MOVABLE GRIDS AND COWLS ASSEMBLED BY RECESSING

(71) Applicant: SAFRAN NACELLES, Gonfreville-l'Orcher (FR)

(72) Inventors: Patrick André Boileau, Moissy-Cramayel (FR); Fabien Jourdan, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/264,328

(22) PCT Filed: Feb. 2, 2022

(86) PCT No.: PCT/FR2022/050197
§ 371 (c)(1),
(2) Date: Aug. 4, 2023

(87) PCT Pub. No.: WO2022/167754
PCT Pub. Date: Aug. 11, 2022

(65) Prior Publication Data
US 2024/0093661 A1  Mar. 21, 2024

(30) Foreign Application Priority Data
Feb. 5, 2021 (FR) ...................... 2101103

(51) Int. Cl.
*F02K 1/72* (2006.01)
*F02K 1/76* (2006.01)

(52) U.S. Cl.
CPC ............... *F02K 1/72* (2013.01); *F02K 1/766* (2013.01)

(58) Field of Classification Search
CPC ... F02K 1/70; F02K 1/72; F02K 1/766; F02K 1/78; B64D 29/08
See application file for complete search history.

(56) References Cited

U.S. PATENT DOCUMENTS

| | | | |
|---|---|---|---|
| 4,549,708 A | 10/1985 | Norris | |
| 5,826,823 A * | 10/1998 | Lymons | ................... F02K 1/76 239/265.29 |
| 8,875,486 B2 * | 11/2014 | Roberts | ................. B64D 29/06 239/265.29 |

(Continued)

FOREIGN PATENT DOCUMENTS

| | | |
|---|---|---|
| FR | 3087497 A1 | 4/2020 |
| WO | 2014091140 A1 | 6/2014 |

OTHER PUBLICATIONS

International Search Report for issued in Application No. PCT/FR2022/050197 dated May 2, 2022.

(Continued)

*Primary Examiner* — Alain Chau
(74) *Attorney, Agent, or Firm* — Pearne & Gordon LLP

(57) ABSTRACT

A thrust reverser with movable grids, includes structure for connecting, by recessing, a front frame of an outer cowl and a rear frame of the grids. The reverser includes loading structure configured to exert a stress pressing against the connecting structure, under the action of a circumferential pull of the front frame of the outer cowl or of a tightening band supported by the front frame.

10 Claims, 16 Drawing Sheets

(56) References Cited

U.S. PATENT DOCUMENTS

| | | | | |
|---|---|---|---|---|
| 8,894,012 | B2* | 11/2014 | Hemeury | B64D 29/08 |
| | | | | 244/129.4 |
| 9,004,855 | B2* | 4/2015 | Vauchel | B64D 29/06 |
| | | | | 415/126 |
| 9,388,769 | B2* | 7/2016 | Provost | F02K 1/80 |
| 9,677,502 | B2* | 6/2017 | Caruel | F02K 1/72 |
| 11,187,189 | B2* | 11/2021 | Journade | B64D 29/08 |
| 2010/0284806 | A1* | 11/2010 | Vauchel | B64D 29/08 |
| | | | | 415/214.1 |
| 2012/0018005 | A1* | 1/2012 | Soulier | E05B 51/023 |
| | | | | 137/15.1 |
| 2015/0260126 | A1* | 9/2015 | Caruel | F02K 1/72 |
| | | | | 239/265.19 |
| 2016/0146154 | A1 | 5/2016 | Scarr et al. | |
| 2020/0079516 | A1* | 3/2020 | Gaches | B64D 29/06 |
| 2020/0182194 | A1* | 6/2020 | Journade | B64D 29/06 |

OTHER PUBLICATIONS

Written Opinion for PCT/FR2022/050197 dated May 2, 2022.
Search Report issued in French Patent Application No. 2101103 dated Oct. 11, 2021.

* cited by examiner

THRUST REVERSER COMPRISING MOVABLE GRIDS AND COWLS ASSEMBLED BY RECESSING

This is the National Stage of PCT international application PCT/FR2022/050197, filed on Feb. 2, 2022 entitled "THRUST REVERSER COMPRISING MOVABLE GRIDS AND COWLS ASSEMBLED BY RECESSING", which claims the priority of French Patent Application No. 2101103 filed Feb. 5, 2021, both of which are incorporated herein by reference in their entireties.

TECHNICAL FIELD

The invention relates to the field of the thrust reversers for aircraft propulsion units, comprising movable grids.

PRIOR ART

The document WO 2014/091140 A1 describes a thrust reverser with movable grids of the prior art.

The reverser described in the aforementioned document has a "D" architecture, known as "D-Duct", comprising two half-assemblies which can be displaced between a closed position, or flight position, and an open position intended for the maintenance of the propulsion unit.

In the closed position, outer cowls of the half-assemblies cooperate with the grids so as to form a coupling which is movable in translation between an advanced position allowing generating a thrust and a retracted position allowing generating a counter-thrust. To this end, the reverser comprises connecting means comprising a spline formed by the grids and a knife carried by the cowls. When the half-assemblies are displaced from the open position to the closed position, the knife becomes is housed in the spline. The half-assemblies are then held in the closed position by locks.

Such connecting means and such locks do not allow, as such, ensuring a satisfactory maintenance of the connection between the cowls and the grids, taking into account in particular the dynamic loads applied on the coupling.

DISCLOSURE OF THE INVENTION

An object of the invention is to provide a thrust reverser capable of improving and securing the connection of the cowls with the grids in all the operating phases of the reverser, in particular when the coupling is in the advanced position, in the retracted position or in any intermediate position.

To this end, the invention relates to a thrust reverser for an aircraft propulsion unit, comprising a fixed portion, two cowls and deflection grids, each of the cowls being connected to the fixed portion according to a pivot connection so as to be able to be displaced between a closed position and an open position intended for the maintenance of the propulsion unit, the reverser comprising connecting means comprising one or several tabs formed by the cowls or respectively by the grids and at least one groove formed by the grids or respectively by the cowls, the connecting means being configured such that the tab(s) fit into the at least one groove when the cowls are displaced from the open position to the closed position such that, in the closed position, the cowls and the grids form a coupling which is movable relative to the fixed portion in translation along a longitudinal axis between an advanced position allowing the propulsion unit to generate a thrust and a retracted position allowing the propulsion unit to generate a counter-thrust.

According to the invention, the reverser comprises tension members connected to the grids and being configured so as to exert a stress pressing the tab(s) into the at least one groove.

The fact of connecting the tension members to the grids allows obtaining a pressing stress capable of effectively maintaining the tab(s) in the at least one groove in all operating phases of the reverser, whether the coupling is in the advanced position, in the retracted position or in an intermediate position and during the displacement of the coupling between these different positions.

This results in an improvement in maintaining the connection between the cowls and the grids and consequently in an increased safety.

The tension members are preferably configured to cooperate with the cowls and/or with one or more force transmission parts.

Preferably, the cowls comprise a frame forming the tab(s), or respectively the at least one groove, the tension members being configured to cooperate with the frame of the cowls or with one or more force transmission parts carried by the frame of the cowls.

The tension members can thus act directly on the connecting means or on one or more transmission parts acting directly on the connecting means.

This allows further improving the maintenance of the connection between the cowls and the grids.

In one embodiment, the tension members comprise at least one lock.

In one embodiment, the tension members comprise at least one compass comprising at least two connecting rods hinged to each other, one of the connecting rods being connected to the grids, the other connecting rod being connected to one of the cowls.

The tension members can comprise both such a lock and such a compass.

In one embodiment in which the tension members comprise at least one such compass, the compass is configured to take a first configuration when the cowls are in the closed position and a second configuration when the cowls are in the open position, the reverser comprising a blocking member allowing blocking the compass in the first configuration.

In this case, the reverser preferably comprises a control mechanism allowing unblocking the compass to be able to place it in the second configuration.

The control mechanism may comprise a cable and a handle configured such that an actuation of the handle exerts a pull of the cable causing a displacement of the blocking member.

According to a first type of embodiment, the reverser comprises one or more force transmission parts, the tension members cooperating with this or these force transmission part so as to exert said pressing stress.

Preferably, the reverser comprises one or more tightening bands forming said one or more force transmission parts, each of the tightening bands extending radially outside the connecting means and circumferentially about the longitudinal axis.

Preferably, each of the tightening bands comprising two circumferential ends which are each configured to be connected to the grids by a respective one of the tension members such that the tension members can exert a circumferential stress on the tightening bands.

In one embodiment in which the tension members comprise at least one lock, at least one of the circumferential ends of at least one of said tightening bands is connected to said lock.

In one embodiment in which the tension members comprise at least one compass as defined above, at least one of the circumferential ends of at least one of said tightening bands is connected to said compass so as to preserve the connection between this tightening band and the grids when the cowls are displaced between the open and closed positions.

In order to resist the mechanical and thermal stresses to which they are subjected during the operation of the propulsion unit, the tightening bands preferably comprise a metal material.

In one embodiment, the tightening bands comprise primary tightening bands and secondary tightening bands configured such that the pressing stress is exerted by the primary tightening bands when these are operational and by the secondary tightening bands in the case of breakage or failure of the primary tightening bands.

According to a second type of embodiment, the tension members cooperate directly with the cowls, preferably with said frame of the cowls.

Thus, in one embodiment in which the tension members comprise at least one compass as defined above, the compass is configured to exert a circumferential stress on one of the cowls, more preferably on said frame of this cowl.

The first and the second type of embodiments described above and, more generally, the different features described in the present document may be combined with each other.

It is indicated above that the connecting means comprise "one or more tabs formed by the cowls or respectively by the grids and at least one groove formed by the grids or respectively by the cowls" and that, preferably, "the cowls comprise a frame forming the tab(s), or respectively the at least one groove".

Thus, according to a first variant, the at least one groove is formed by the grids and each of the cowls, preferably said frame of these cowls, forms one or more of said tabs.

According to a second variant, each of the cowls, preferably said frame of these cowls, forms at least one groove and the grids form said tab(s).

A third variant consists in combining the two aforementioned variants.

For example, the grids can form, at the same time, one or more grooves and one or more tabs and each of the cowls, in particular said frame of these cowls, can form one or more grooves and/or one or more complementary tabs.

The invention also relates to a nacelle comprising such a reverser, a propulsion unit comprising such a nacelle and an aircraft comprising such a propulsion unit.

According to another aspect, the invention relates to a method for pressing the tab(s) into the at least one groove of a reverser as defined above.

In one embodiment, this method comprises a step of applying a circumferential stress by the tension members to the cowls or to one or more force transmission parts.

Other advantages and features of the invention will appear on reading the following detailed, non-limiting description.

BRIEF DESCRIPTION OF THE DRAWINGS

The following detailed description refers to the appended drawings in which.

DETAILED DESCRIPTION OF EMBODIMENTS

FIGS. 1 to 7 comprise a reference frame X1-X2-X3 defining respectively longitudinal, vertical and lateral directions which are orthogonal to each other. FIGS. 8-23 and 25-27 comprise a reference frame X4-X5-X6 defining respectively longitudinal, radial and circumferential directions which are orthogonal to each other.

FIGS. 1 to 5 show a propulsion unit 1 having a longitudinal central axis A1.

Subsequently, the terms "front" and "rear" are defined relative to a direction S1 of gas flow through the propulsion unit 1 along the axis A1 when said propulsion unit generates a thrust.

The propulsion unit 1 comprises a turbomachine 2 (shown in FIG. 1), a nacelle 3 and a mast 4 (shown in FIGS. 2 to 5) allowing connecting the propulsion unit 1 to a wing of an aircraft (not represented).

Figure 1:
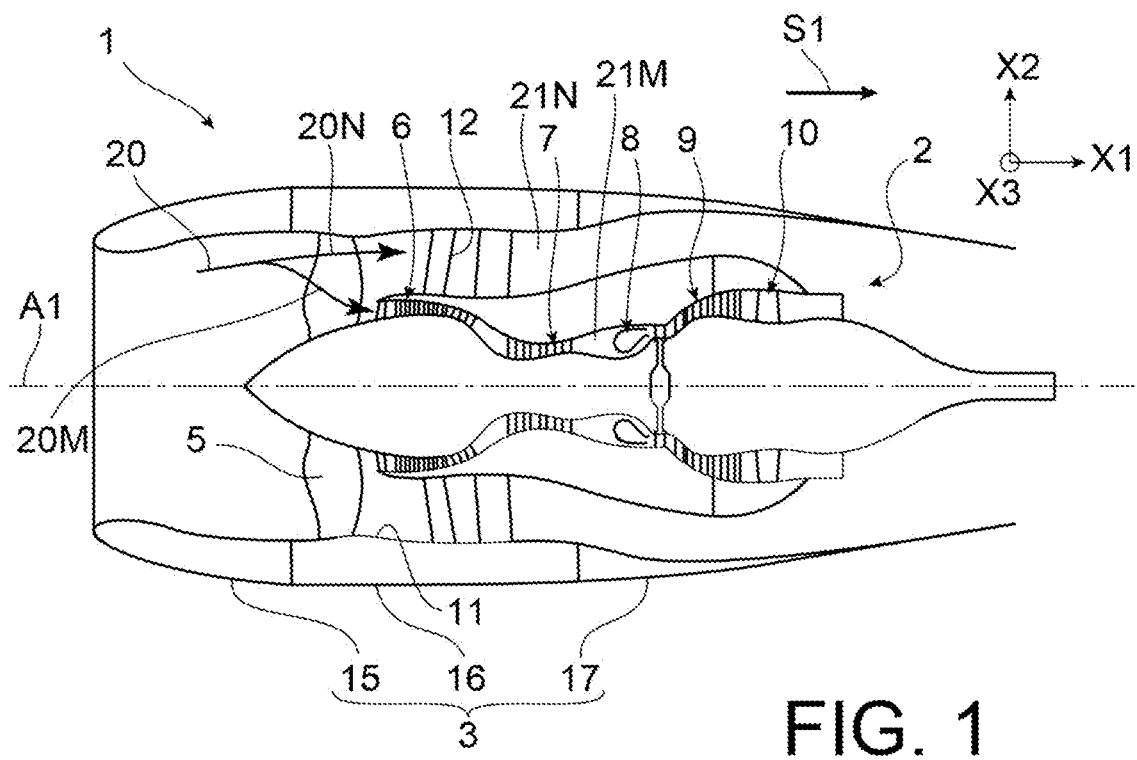
FIG. 1 is a longitudinal sectional schematic view of an aircraft propulsion unit comprising a bypass turbojet engine and a thrust reverser in a direct thrust configuration.

In the example of FIG. 1, the turbomachine 2 is a bypass turbojet engine comprising, from front to back, a fan 5, a low-pressure compressor 6, a high-pressure compressor 7, a combustion chamber 8, a high-pressure turbine 9 and a low-pressure turbine 10. The compressors 6 and 7, the combustion chamber 8 and the turbines 9 and 10 form a gas generator.

The turbojet engine 2 comprises a fan casing 11 connected to the gas generator by structural arms 12.

The nacelle 3 comprises a front section 15 forming an air inlet, a middle section 16 which includes fan cowls enveloping the fan casing 11 and a rear section 17.

In a manner known per se, during the operation of the turbojet engine 2, an air flow 20 enters the propulsion unit 1 through the air inlet 15, passes through the fan 5 then is divided into a central primary flow 20M and a secondary flow 20N. The primary flow 20M flows in a primary gas circulation conduit 21M within the gas generator. The secondary flow 20N flows, in turn, in a secondary conduit 21N surrounding the gas generator and delimited radially outwardly by the nacelle 3.

The nacelle 3 comprises a thrust reverser formed by the rear section 17.

Figure 3:
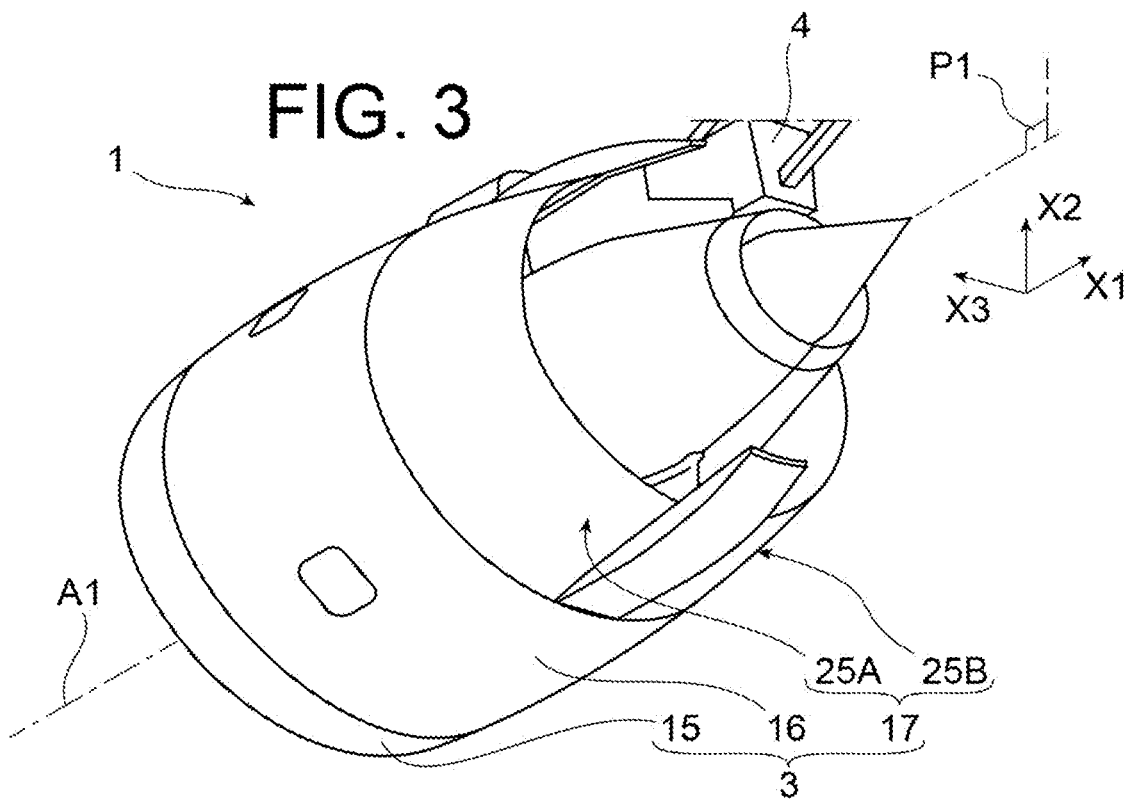

With reference to FIG. 3, the rear section 17 comprises two half-assemblies 25A and 25B of semi-cylindrical shape and which are symmetrical with respect to each other relative to a vertical plane P1 passing through the axis A1 and parallel to the vertical direction X2. Thus, the half-assemblies 25A and 25B extend laterally on either side of the vertical plane P1 and in particular on either side of the mast 4.

Figure 4:
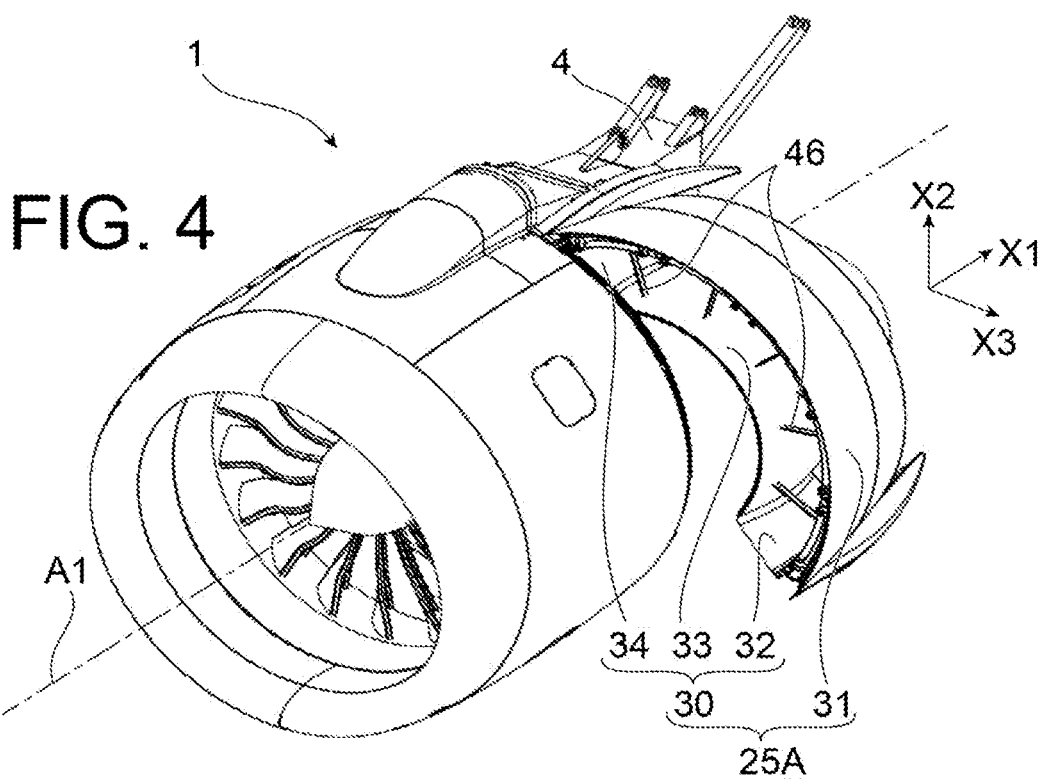
FIG. 4 is a perspective schematic view of the propulsion unit of FIG. 1, in a maintenance configuration.

With reference to FIG. 4 which shows the half-assembly 25A in an open position, the half-assembly 25A comprises an inner fairing 30 and an outer cowl 31.

The inner fairing 30, commonly called "inner fixed structure", includes a lower junction wall 32 also called "island" or "six-o'clock" "bifurcation", a central wall 33 of semi-annular shape and an upper junction wall 34 also called "island" or "twelve o'clock" "bifurcation".

The cowl 31 extends radially outside the central wall 33 of the inner fairing 30 and also has a semi-annular shape.

The central wall 33 of the inner fairing 30 and the cowl 31 define radially therebetween a circumferential sector of the secondary conduit 21N, this sector extending circumferentially between the lower junction wall 32 and the upper junction wall 34 of the inner fairing 30.

The half-assembly 25A is connected, by one of the circumferential ends thereof, to a fixed portion of the propulsion unit 1, in this case to a beam 41 (shown in FIGS. 12, 20 and 25) secured to the mast 4, according to a pivot connection so as to be able to be displaced between a closed position illustrated in FIG. 3 and the open position of FIG. 4.

In this example, the displacement of the half-assembly 25A between the closed and open positions corresponds to a simultaneous displacement of the cowl 31 and the inner fairing 30 which are secured to each other in rotation about the axis formed by said pivot connection. In other words, the reverser, in this example, has a "D" architecture.

The open position allows a maintenance operator to access the turbojet engine 2.

The above description applies by analogy to the half-assembly 25B.

In order to maintain the half-assemblies 25A and 25B in the closed position (FIG. 3), these are connected to each other using bolts (not represented) mounted at six o'clock, vertically opposite to the mast 4.

Figure 5:
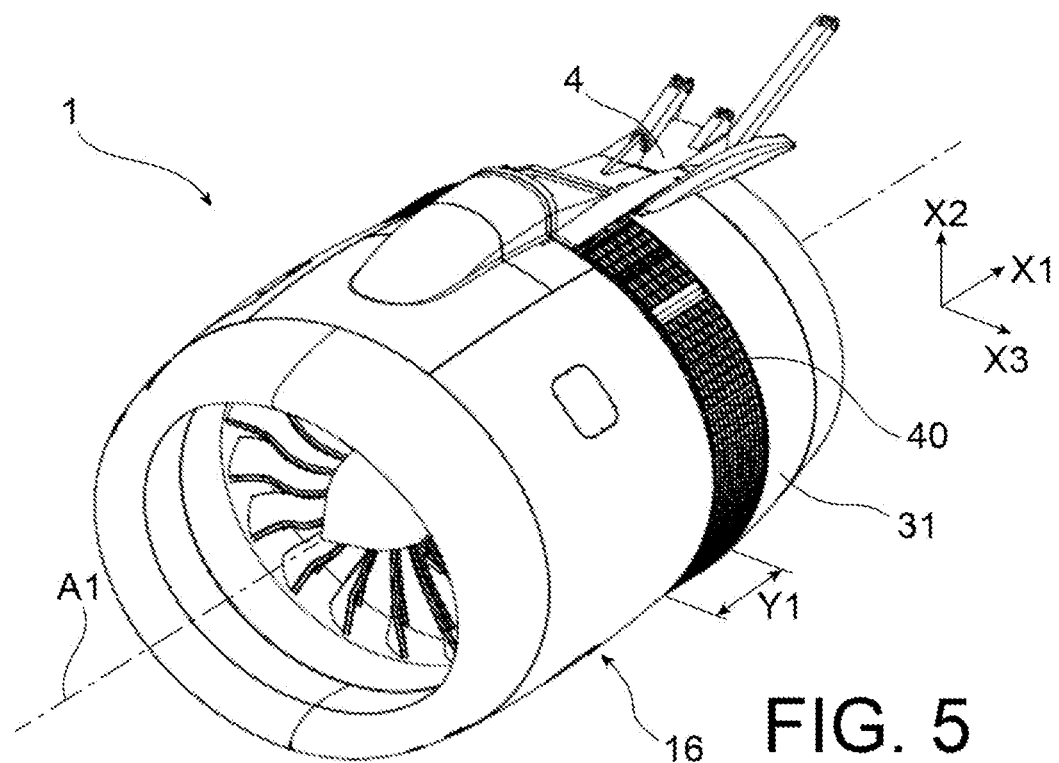
FIG. 5 is a perspective schematic view of the propulsion unit of FIG. 1, in a thrust reversal configuration.
Figure 6:
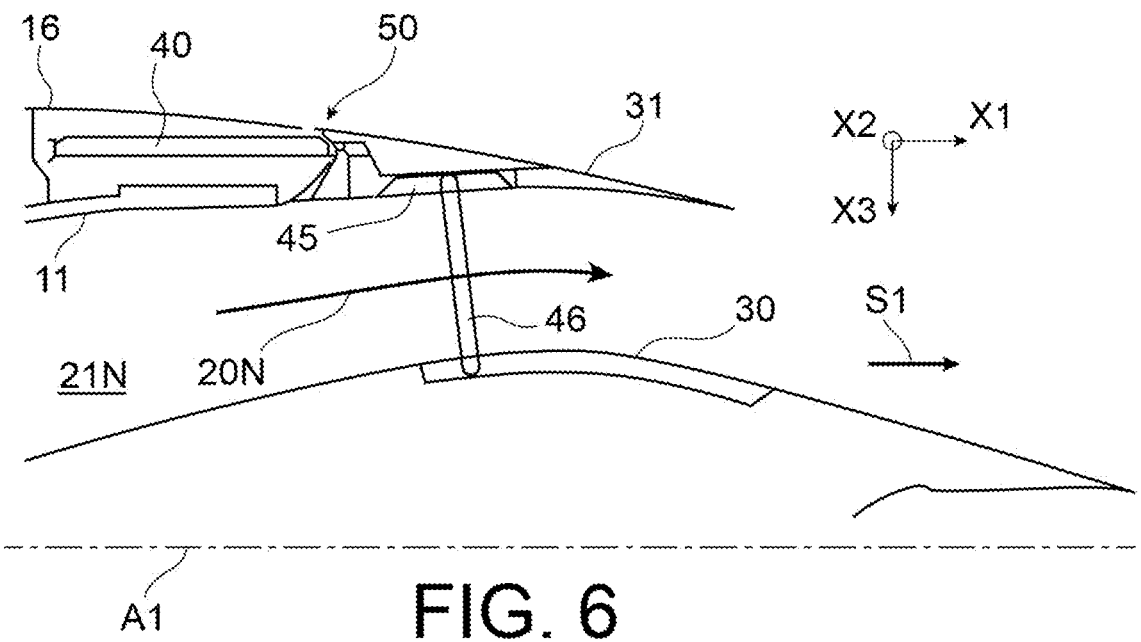
FIG. 6 and
FIG. 7 are longitudinal sectional schematic half-views of the reverser of the propulsion unit of FIG. 1, respectively in a direct thrust configuration and in a thrust reversal configuration.
Figure 7:
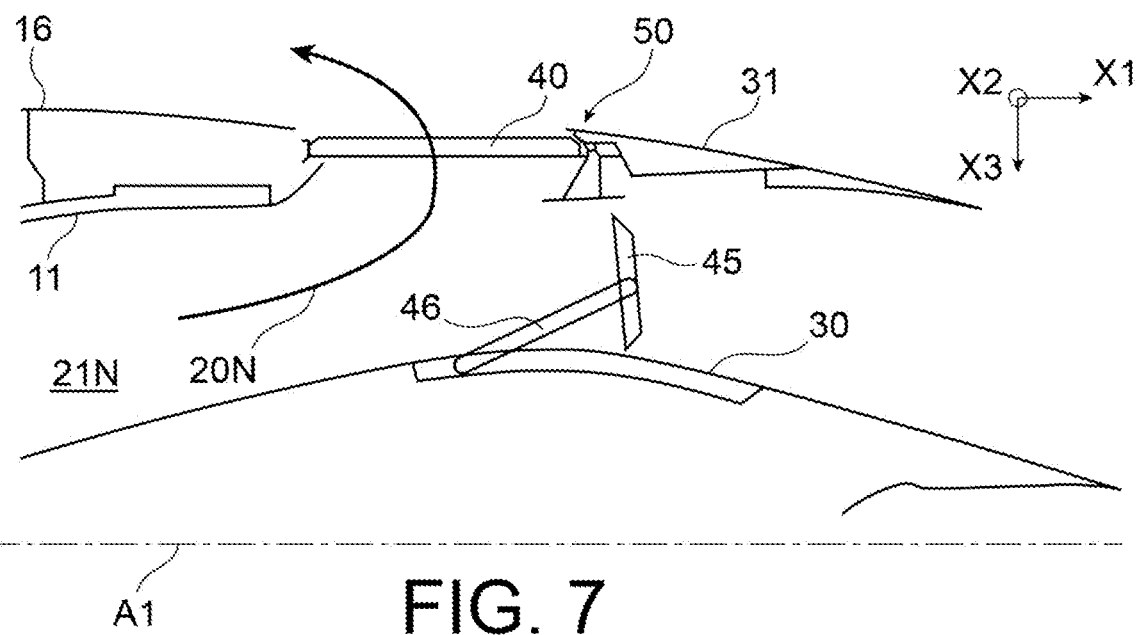

With reference to FIGS. 5 to 7, the reverser comprises grids 40 and connecting means 50 configured to connect the cowl 31 of each of the half-assemblies 25A and 25B to the grids 40 when the half-assemblies 25A and 25B are in the closed position.

Figure 2:
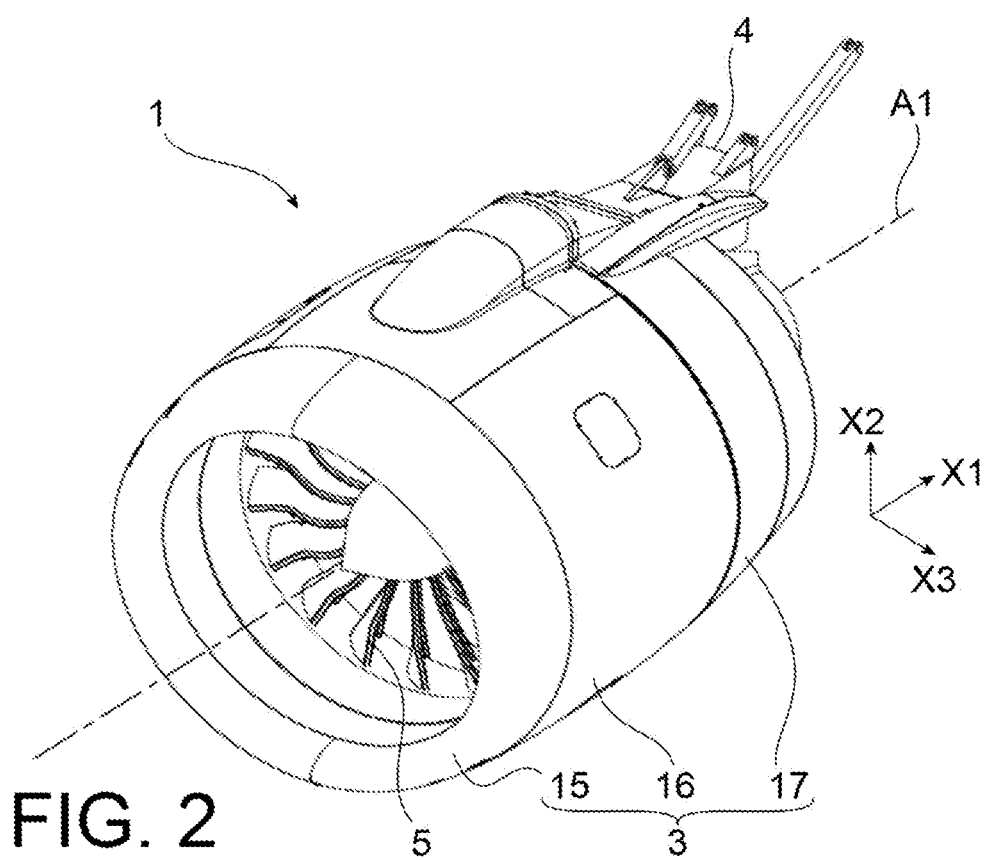
FIG. 2 and
FIG. 3 are perspective schematic views of the propulsion unit of FIG. 1, in a direct thrust configuration.

The cowls 31 and the grids 40 thus connected form a coupling ich is movable in translation along the axis A1 between an advanced position illustrated in FIGS. 2, 3 and 6 and a retracted position illustrated in FIGS. 5 and 7.

In this example, this coupling is movable relative to said fixed portion of the propulsion unit 1 and relative to the inner fixed structure 30 of each of the half-assemblies 25A and 25B.

In the advanced position (FIGS. 2, 3 and 6), the grids 40 are housed in a circumferential space formed by the middle section 16 and a front end of the cowls 31 bears on a rear end of the middle section 16.

In the advanced position, the secondary conduit 21N channels the secondary flow 20N towards the rear of the propulsion unit 1 so as to generate a thrust (see FIG. 6).

In the retracted position (FIGS. 5 and 7), the front end of the cowls 31 and the rear end of the middle section 16 are remote from each other by a distance Y1 defining a radial opening. The grids 40 extend longitudinally between the rear end of the middle section 16 and the front end of the cowls 31 and circumferentially about the axis A1 so as to extend through said radial opening.

In a manner known per se, each of the half-assemblies 25A and 25B comprises sealing flaps 45 hinged on the cowl 31 and connecting rods 46 which are each connected, on the one hand, to a respective one of the flaps 45 and, on the other hand, to the central wall 33 of the inner fixed structure 30 such that, when the cowl 31 passes from the advanced position to the retracted position, the flaps 45 are deployed radially in the secondary conduit 21N so as to seal this conduit 21N (see FIG. 7).

The secondary flow 20N is thus directed towards the grids 40 which deflect this flow towards the front of the propulsion unit 1 in order to generate a counter-thrust.

In order to allow the displacement of the coupling between the advanced and retracted positions, the grids 40 and the cowls 31 are connected to beams 41, 42 and 43 (see FIGS. 12, 20 and 25) according to a slide connection and the cowls 31 are driven in translation by actuators (not represented) such as jacks housed in the circumferential space formed by the middle section 16. The connecting means 50 allow driving the grids 40 under the action of the displacement of the cowls 31.

In this example, the grids 40 comprise two half-portions of semi-cylindrical shape and which are symmetrical with respect to each other relative to the vertical plane P1, each of these half-portions having a circumferential dimension which is substantially identical to the circumferential dimension of the cowls 31.

Thus, each of the half-portions of the grids 40 cooperates with a respective one of the cowls 31 when the latter are in the closed position.

The following description relates to the half-assembly 25A as well as to the corresponding half-portion of the grids 40 and applies by analogy to the half-assembly 25B and to the other half-portion of the grids 40.

Figure 8:
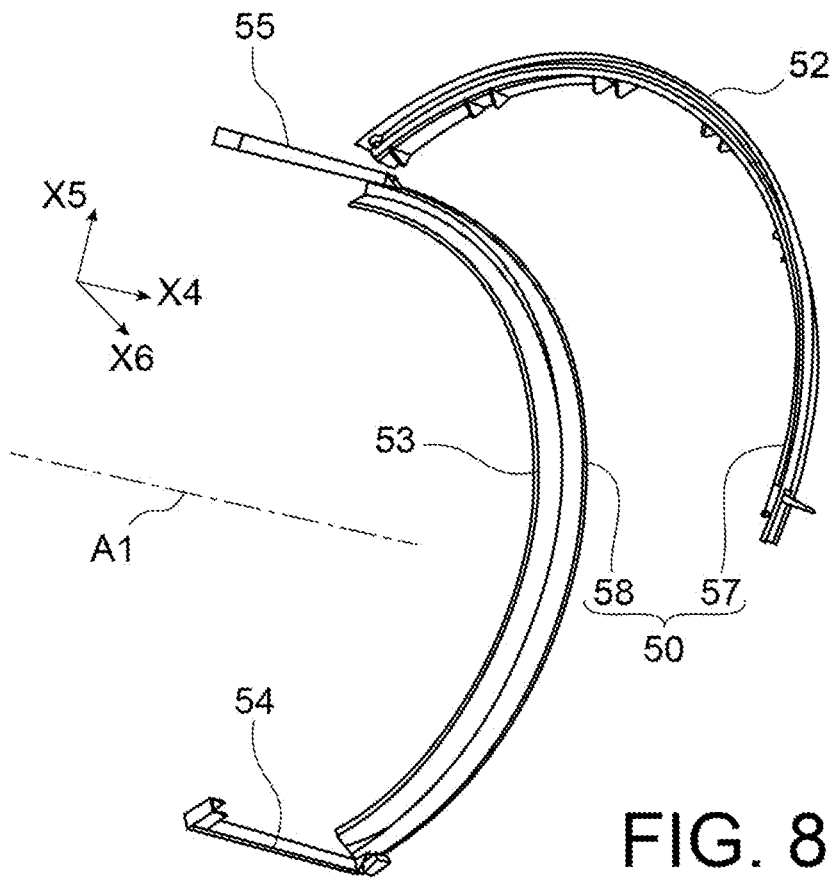
FIG. 8 is a perspective schematic view of an assembly forming grids and a cowl of the reverser of the propulsion unit of FIG. 1, this assembly comprising a rear frame of the grids and a front frame of the cowl in the maintenance configuration of FIG. 4.

FIG. 8 shows, on the one hand, a front frame 52 of the cowl 31 in the open position and, on the other hand, a rear frame 53 of the grids 40 provided to cooperate with the cowl 31 when the latter is placed in the closed position.

FIG. 8 also shows two longerons 54 and 55 allowing in particular connecting the rear frame 53 to a front frame (not represented) of the grids 40.

In the embodiment of FIG. 8, the front frame 52 of the cowl 31 forms a ring segment having two circumferential ends and comprises a tab 57 which extends circumferentially between these two ends and radially inwardly towards the rear frame 53 of the grids 40.

When the cowl 31 is in the closed position, the tab 57 extends circumferentially about the axis A1.

In this example, the tab 57 extends substantially over the entire circumferential dimension of the front frame 52.

The rear frame 53 of the grids 40 also forms a ring segment having two circumferential ends and comprises a groove 58 extending circumferentially between these two ends.

The tab 57 and the groove 58 have a form-fitting connection so that, when the cowl 31 is displaced from the open position (FIGS. 8 and 9) to the closed position (FIGS. 10 and 11), the tab 57 fits into the groove 58.

The connecting means 50 thus allow securing the cowl 31 with the grids 40 by embedding so as to form said coupling.

The invention relates more specifically to loading means allowing applying a stress pressing the tab 57 into the groove 58 in order to improve and secure the connection made by these connecting means 50.

In the embodiment of FIGS. 8 to 24, the loading means comprise a tightening band 60 and two tension members 701/704 and 702/703 of this tightening band 60.

Figure 9:
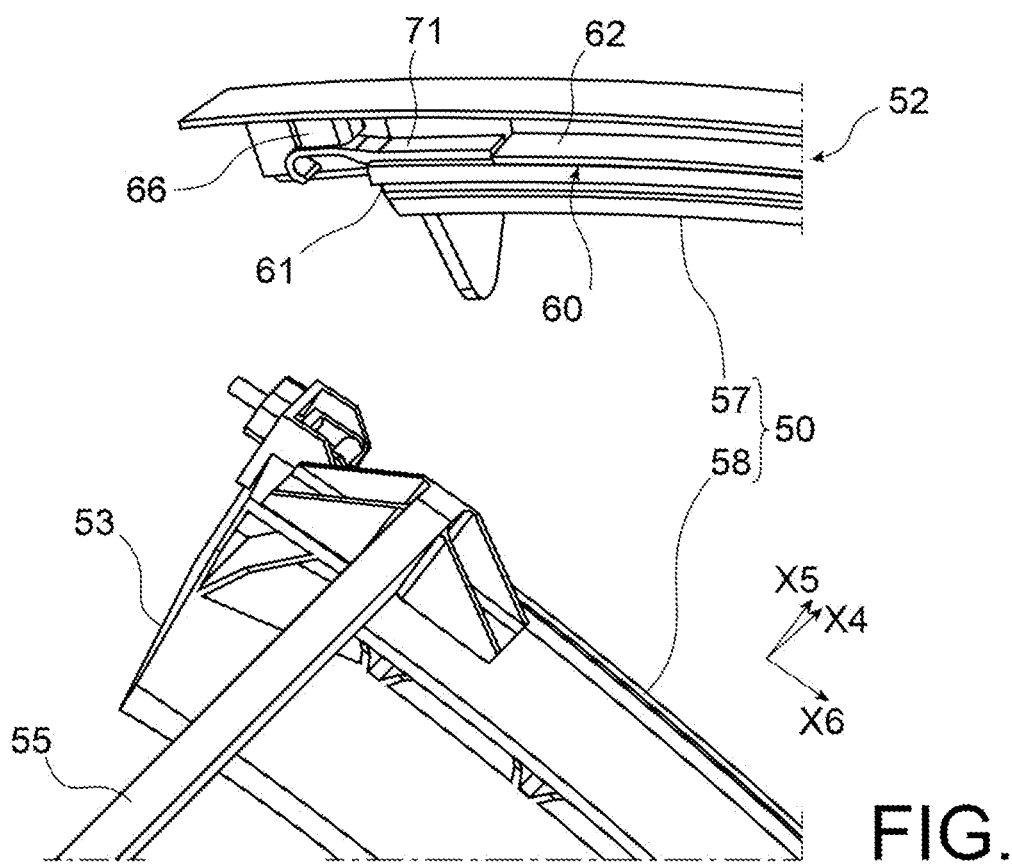
FIG. 9,
FIG. 10 and
FIG. 11 are perspective schematic views of a first circumferential end of the assembly of FIG. 8 according to a first embodiment, showing a tightening band carried by the front frame of the cowl and a first tension member connected to a first end of this tightening band.

With reference to FIG. 9, the front frame 52 of the cowl 31 comprises an element 61 forming radially inwardly the tab 57 and defining radially outwardly a sliding surface.

Figure 10:
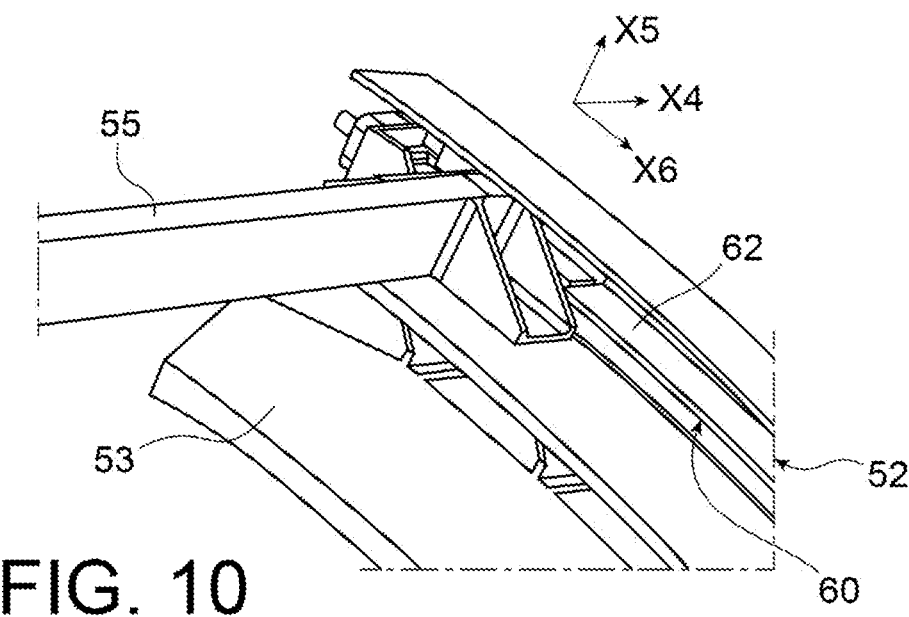
Figure 11:
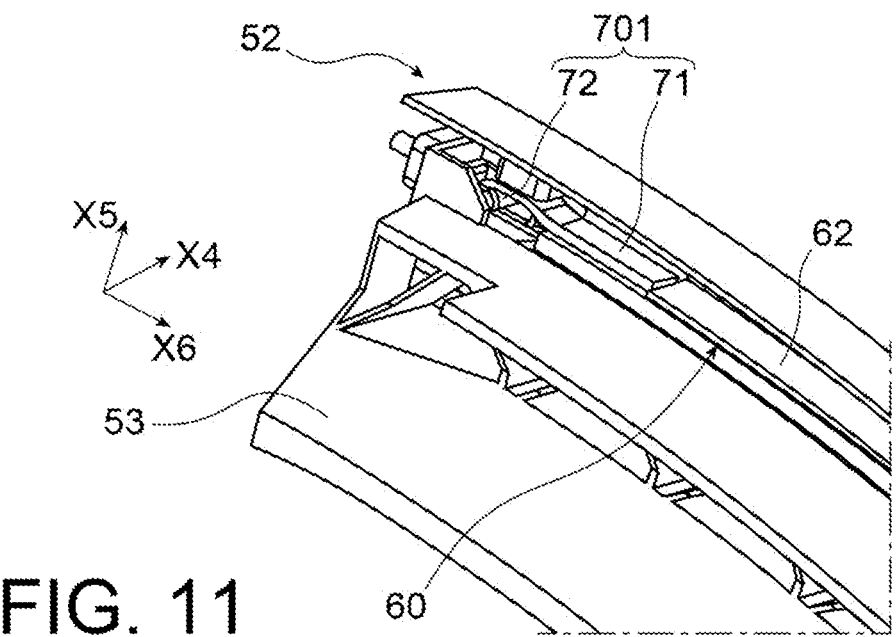

In this example, the front frame 52 of the cowl 31 also comprises a retaining part 62 such as a bracket extending radially outside the element 61 so as to define a radial space between the sliding surface and a radially inner surface of this retaining part 62 (see FIGS. 9 and 10).

The tightening band 60 is housed within this radial space whose radial dimension is greater than the thickness of the tightening band 60.

The tightening band 60 thus extends radially outside the tab 57 and longitudinally at the same level as the latter.

When the cowl 31 is in the closed position, the tightening band 60 extends circumferentially about the axis A1 so as to form two circumferential ends.

Each circumferential end of the tightening band 60 is connected to a respective one of the tension members 701/704 and 702/703.

Figure 12:
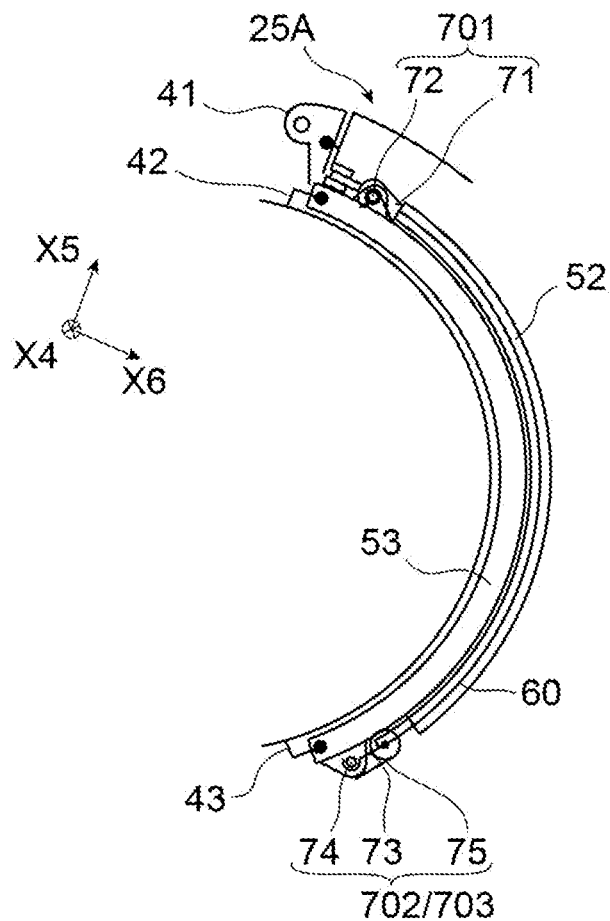
FIG. 12 is a schematic view of a half-portion of the reverser of the propulsion unit of FIG. 1, comprising the assembly of FIG. 8 according to the first embodiment of FIGS. 9-11, this Figure showing said first tension member and a second tension member connected to a second end of the tightening band.
Figure 13:
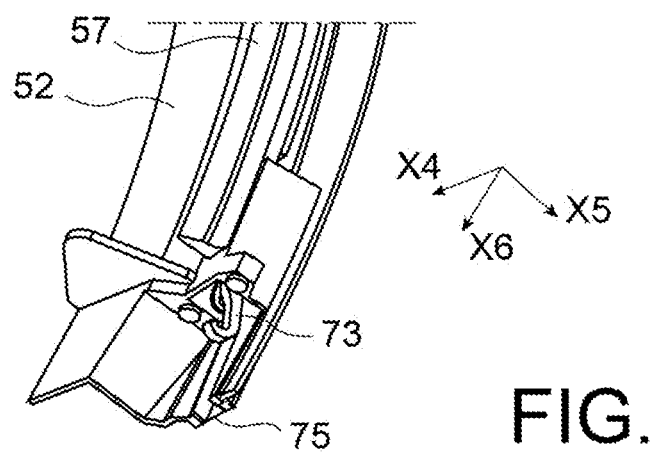
FIG. 13 is a perspective schematic view of a second circumferential end of said front frame of the cowl of the assembly of FIG. 8.

With reference to FIG. 12, the circumferential end of the tightening band 60 located vertically at the top, in the vicinity of the beam 41, is called "first end" and that located vertically at the bottom is called "second end". Similarly, the circumferential end of the front frame 52 of the cowl 31 located vertically at the top, close to the beam 41, is called "first end" and that located vertically at the bottom is called "second end". In what follows, the tension member connected to the first, respectively to the second, end of the tightening band 60 is called "first tension member", respectively "second tension member".

In the embodiment of FIGS. 8 to 17, the first tension member 701 comprises a first attachment element 71 forming a hook and a second attachment element 72 forming a cylinder. The first attachment element 71 is fastened to the first end of the tightening band 60 while the second attachment element 72 is secured to the rear frame 53 of the grids 40.

In the embodiment of FIGS. 8 to 17, the second tension member 702 is a lock comprising a first portion secured to the second end of the tightening band 60 and a second portion secured to the rear frame 53 of the grids 40.

In general, the first portion of the lock 702 comprises a first attachment element 73 forming a hook intended to cooperate with a second attachment element 74 such as a cylinder forming the second portion of this lock.

The lock 702 comprises an actuator 75 in the form of a locking/unlocking handle.

Figure 14:
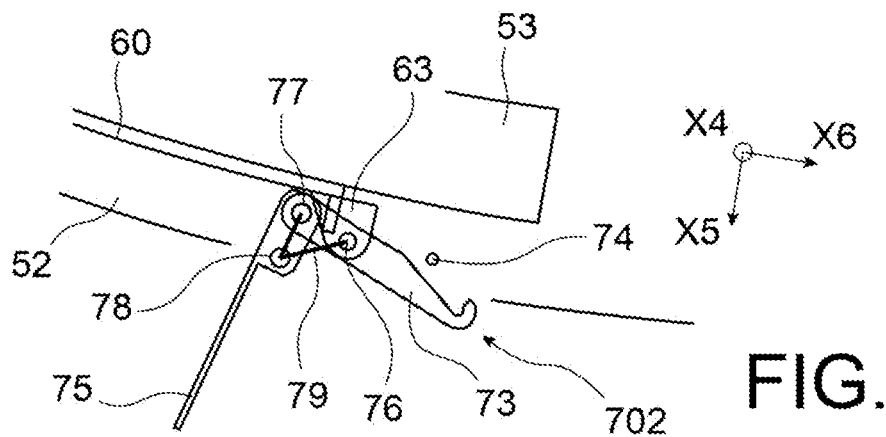
FIG. 14 and
FIG. 15 are schematic views of the second circumferential end of the assembly of FIG. 8, showing the second tension member of FIG. 12 according to a first variant respectively in an unlocking position and in a locking position.
Figure 15:
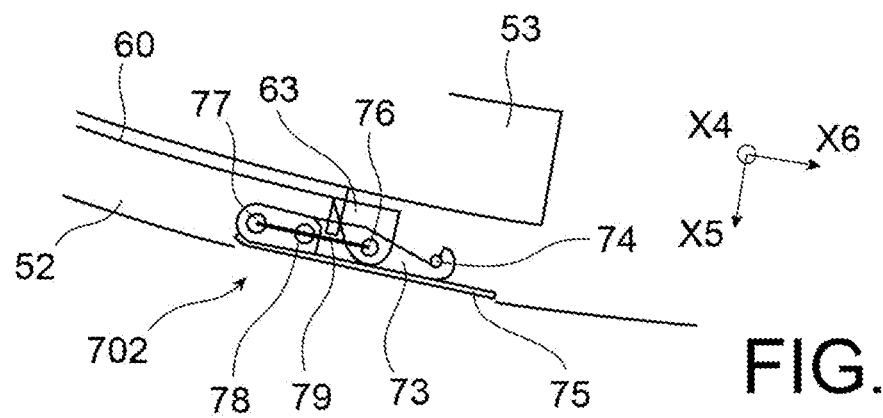

With reference to FIGS. 14 and 15, the first portion of the lock 702 is connected to a hinge member 63 fastened to the second end of the tightening band 60. The first portion of the lock 702 comprises a first hinge 76 defining an axis of rotation both of the hook 73 relative to the hinge member 63 and of a first end of a tie-rod 79 with relative to the hinge member 63. The first portion of the lock 702 also comprises a second hinge 77 defining an axis of rotation of the hook 73 relative to the handle 75 and a third hinge 78 defining an axis of rotation of the handle 75 relative to a second end of the tie-rod 79.

The first tension member 701, the lock 702 and the tightening band 60 constitute loading means allowing generating the pressing stress by manual actuation of the handle 75 of the lock 702.

To do this, after the cowl 31 has been placed in the closed position, the handle 75 is actuated so as to cause the lock 702 to pass from the unlocking state illustrated in FIG. 14 to the locking state illustrated in FIG. 15.

In order to allow a proper positioning of the tightening band 60 during this locking stroke despite the floating mounting of the first portion of the lock 702, the hinge member 63 or another element of the first portion of the lock 702 is in this example configured to bear on a stop formed by the front frame 52 of the cowl 31. By way of example, this stop may be formed by one end of an oblong opening enabling a sliding of the hinge member 63 relative to the front frame 52.

Figure 16:
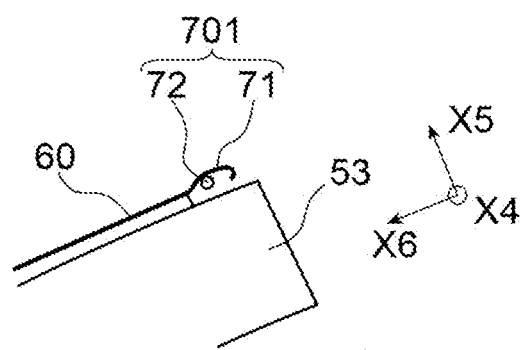
FIG. 16 and
FIG. 17 are schematic views of said first circumferential end of the assembly of FIG. 8, showing the first tension member respectively in a disengagement position and in an engagement position.
Figure 17:
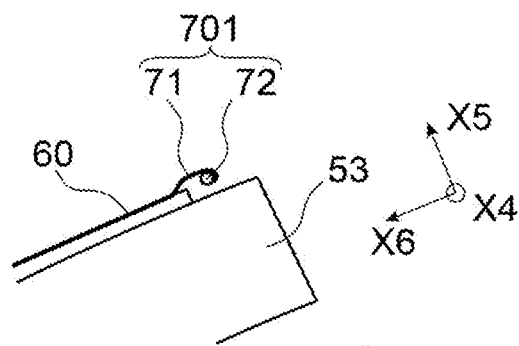

During this locking stroke, the lock 702 exerts a pulling force on the second end of the tightening band 60 such that the hook 71 of the first tension member 701 bears on the cylinder 72, causing the first tension member 701 to pass from the disengagement state illustrated in FIG. 16 to the engagement state illustrated in FIG. 17.

In order to guarantee the engagement of the cylinder 72 into the hook 71, the front frame 52 of the cowl 31 comprises, in the example of FIG. 9, a radial stop 66.

In one embodiment which is not represented, a prestressing member is interposed radially between the hook 71 and the radial stop 66, for example a spring fastened to the hook 71.

The tightening band 60 and the tension members 701 and 702 are configured so that the first tension member 701 reaches the engagement state (FIG. 17) during a first portion of the locking stroke, that is to say before the lock 702 reaches the locking state (FIG. 15).

During a second portion of the locking stroke, the two tension members 701 and 702 exert, on the tightening band 60, an increasing circumferential stress which presses the tightening band 60 against the sliding surface formed by the front frame 52 of the cowl 31. This surface enables a relative circumferential sliding of the tightening band 60 relative to the frame 52.

The pressing of the pulled tightening band 60 allows generating the stress pressing the tab 57 into the groove 58.

The tightening band 60 thus forms a force transmission part allowing producing a mechanical action in line with the connecting means 50, that is to say in a transverse plane passing through the connecting means 50.

Figure 18:
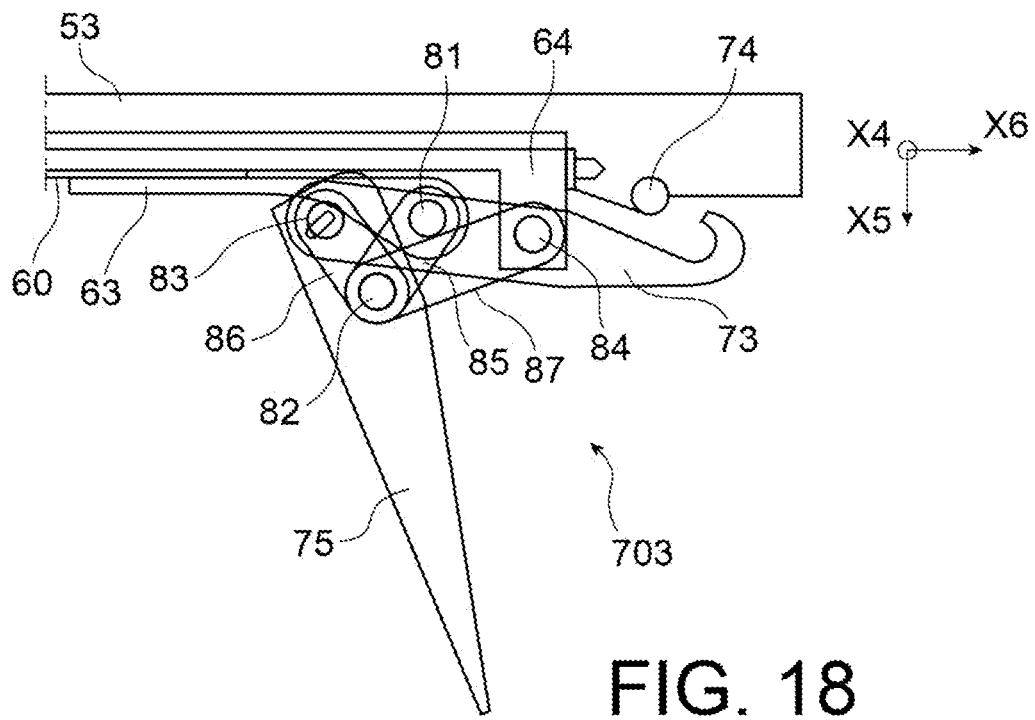
FIG. 18 and
FIG. 19 are schematic views of the second circumferential end of the assembly of FIG. 8, showing the second tension member of FIG. 12 according to a second variant respectively in an unlocking position and in a locking position.
Figure 19:
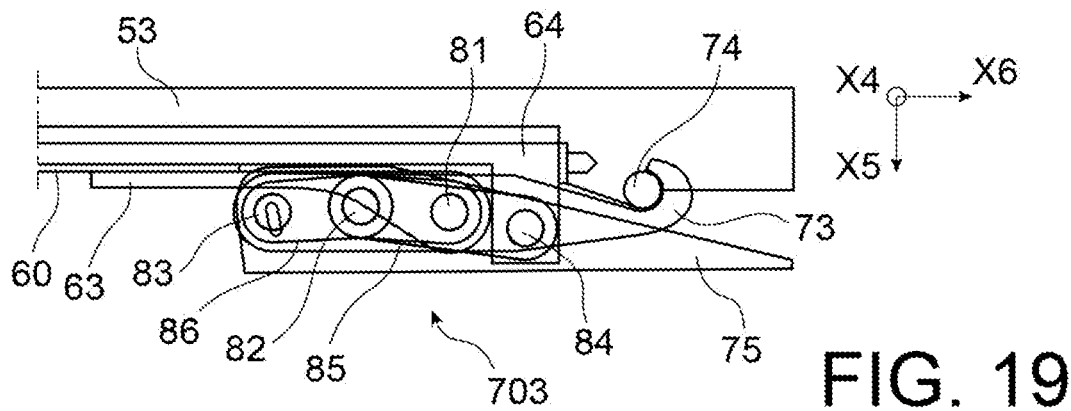

FIGS. 18 and 19 show another type of lock 703 which can form the second tension member of the assembly of FIG. 12.

Unlike the lock 702, the first portion of the lock 703 is not mounted floating, but is connected to a portion 64 of the front frame 52.

In the example of FIGS. 18 and 19, the lock 703 comprises four hinges 81, 82, 83 and 84 and three tie-rods 85, 86 and 87. The hinge 81 defines an axis of rotation of a first end of the tie-rod 85 relative to the hinge member 63 fastened to the tightening band 60. The hinge 82 defines an axis of rotation of a second end of the tie-rod 85 relative to a first end of each of the tie-rods 86 and 87. The hinge 83 defines a common axis of rotation for a second end of the tie-rod 86, the hook 73 and the handle 75. The hinge 84 defines, in turn, an axis of rotation of a second end of the tie-rod 87 relative to the portion 64 of the front frame 52.

In the different embodiments described above, the tension members 701, 702 and 703 form detachable joining means, capable of connecting the tightening band 60 to the rear frame 53 of the grids 40 when the cowl 31 is in the closed position and of unsecuring it, at least partially, from this rear frame 53 when the cowl 31 is displaced towards the open position.

Figure 20:
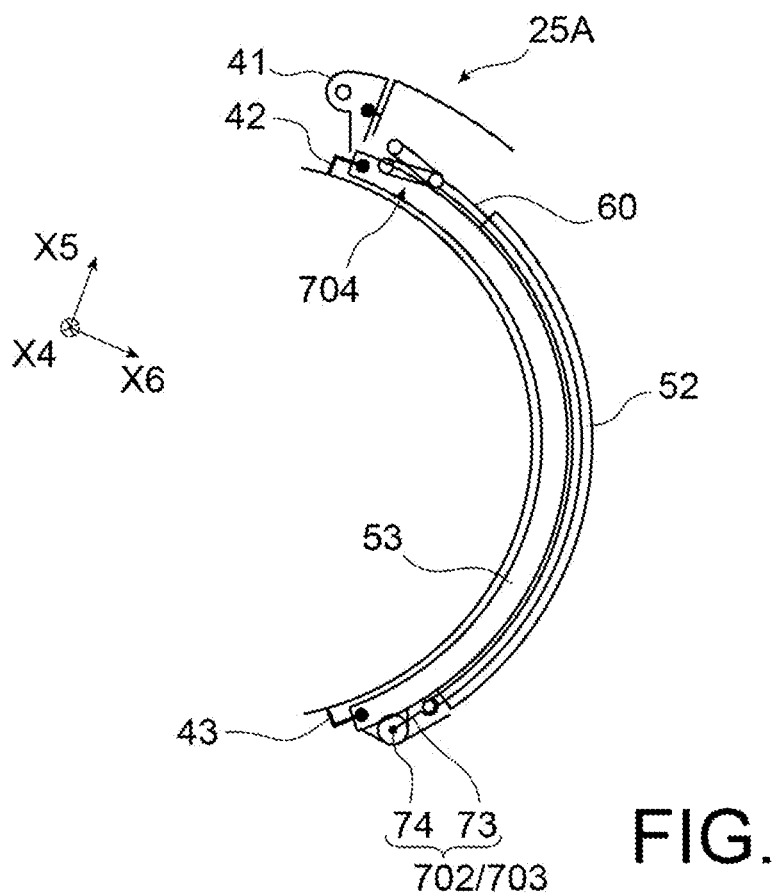
FIG. 20 is a schematic view of a half-portion of the reverser of the propulsion unit of FIG. 1 according to a second embodiment, comprising a rear frame of grids, a front frame of cowl, a tightening band carried by the front frame, as well as two tension members connected to the grids and cooperating with the tightening band, one of the tension members comprising a compass, the other tension member comprising a lock.
Figure 21:
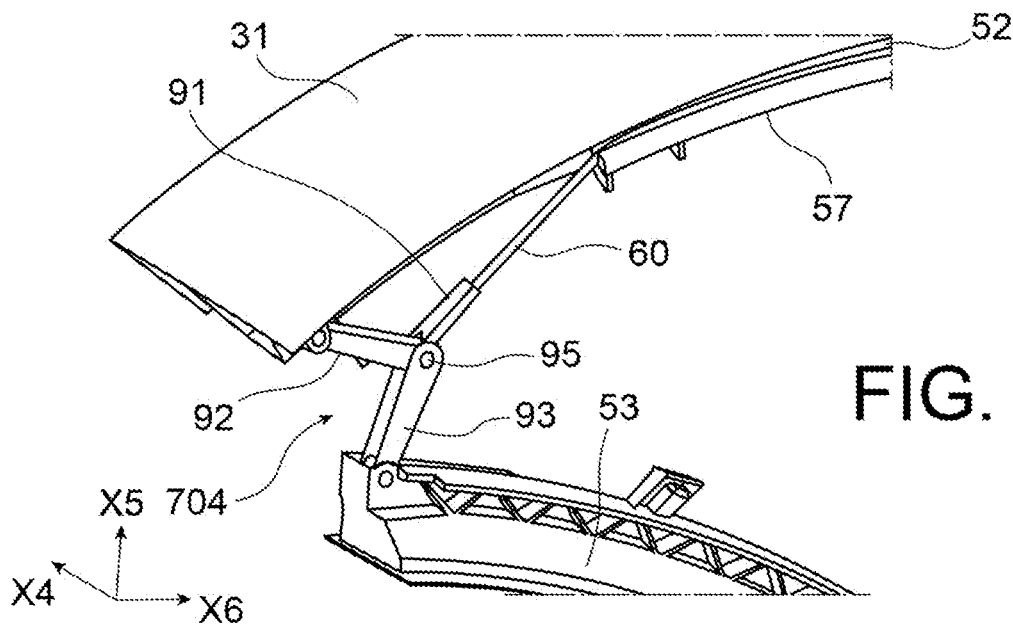
FIG. 21 and
FIG. 22 are perspective partial schematic views of the half-portion of the reverser of FIG. 20, showing the compass and the cowl respectively in a first position corresponding to the maintenance configuration of FIG. 4 and in a second position corresponding to the flight configuration of FIGS. 1-3.
Figure 22:
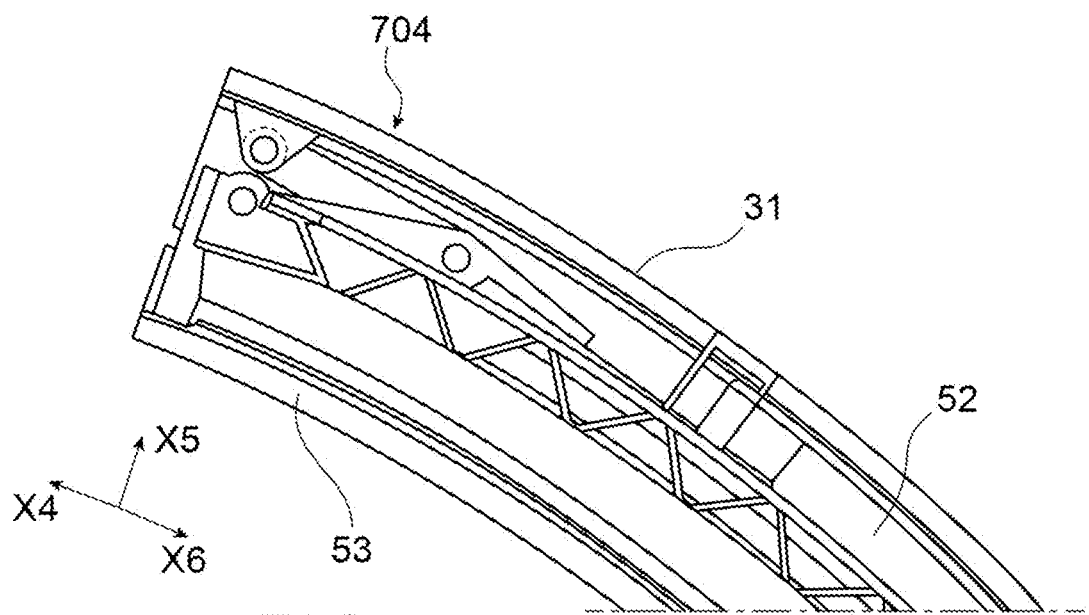

The embodiment of FIGS. 20 to 22 differs from the embodiments described above in that the first tension member 704 forms a means for permanently joining the tightening band 60 to the rear frame 53 of the grids 40.

With reference to FIG. 21, the first tension member 704 comprises a connecting part 91 which is fastened to the first end of the tightening band 60 and connected to two connecting rods 92 and 93 hinged to each other so as to form a compass.

More specifically, the first tension member 704 comprises a hinge element 95 such as a shaft to which the connecting part 91 and a first end of each of the connecting rods 92 and 93 are connected according to a pivot connection.

The second end of the connecting rod 92 is hinged on the front frame 52 of the cowl 31 while the second end of the connecting rod 93 is hinged on the rear frame 53 of the grids 40.

Such a tension member 704 allows preserving the connection between the tightening band 60, the grids 40 and the cowl 31 when the latter is displaced between the open position (FIG. 21) and the closed position (FIG. 22). This allows in particular avoiding any problem of engagement and disengagement of detachable joining means such as the member 701 of FIGS. 16 and 17.

In the closed position, the connecting rod 93 extends in continuity of the connecting part 91 and of the tightening band 60, ensuring a good distribution of the pulling forces.

The tension member 704 of FIGS. 20 to 22 moreover allows limiting the amplitude of circumferential sliding of the tightening band 60 during the displacement of the cowl 31 between the open and closed positions.

In this example, the connecting rods 92 and 93 have a stiffness allowing them to contribute to the positioning of the cowl 31 and of the half-assembly 25A during its opening and to ensure its guiding during its closing in order to improve the alignment of the tab 57 relative to the groove 58.

In the above examples, the cowl 31 is equipped with a single tightening band 60.

A second emergency tightening band can be implemented, in particular to overcome the difficulties of access during routine maintenance.

Figure 23:
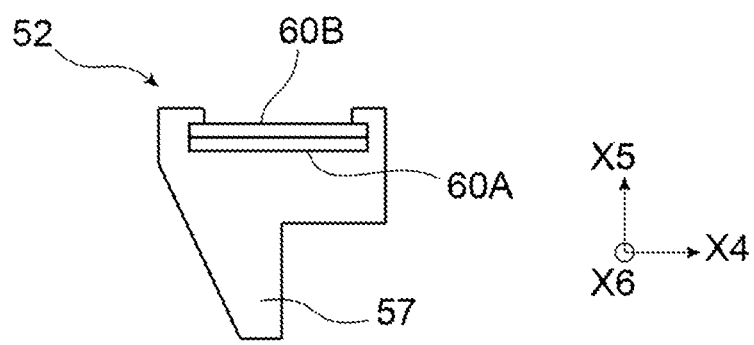
FIG. 23 is a schematic view of a front frame of cowl receiving two superimposed tightening bands.

Thus, in the example of FIG. 23, the front frame 52 of the cowl 31 carries two tightening bands 60A and 60B which are superimposed on each other.

The tightening band 60A forms a primary tightening band implemented in the manner described above, while the tightening band 60B forms an emergency secondary tightening band configured to exert the pressing stress in the case of breakage or failure of the primary tightening band 60A.

To do this, the tightening bands 60A and 60B may be connected by one of the circumferential ends thereof to a tension member configured to exert a differential circumferential stress.

Figure 24:
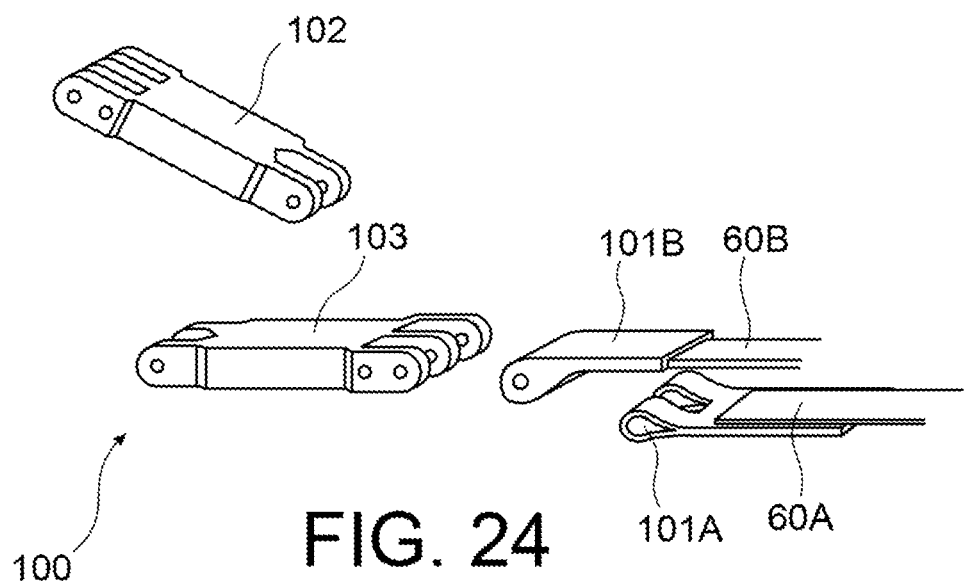
FIG. 24 is a perspective schematic view of a connection member of the tightening bands of FIG. 23.

FIG. 24 shows a tension member 100 capable of performing such a function and which can be mounted in place of the tension member 704 of FIGS. 20 to 22.

In this example, the first end of the tightening band 60A is fastened to a hinge element 101A and the first end of the tightening band 60B is fastened to a hinge element 101B.

Connecting rods 102 and 103, having a function similar to the connecting rods 92 and 93 of FIG. 21, are hinged to each other by a first shaft (not represented) which is secured to a first end of the connecting rod 103.

The hinge elements 101A and 101B are hinged about a second shaft (not represented) which is secured to the first end of a connecting rod 103 and adjacent to the first shaft.

The second end of the connecting rod 102 is hinged on the front frame 52 of the cowl 31 while the second end of the connecting rod 103 is hinged on the rear frame 53 of the grids 40.

Figure 25:
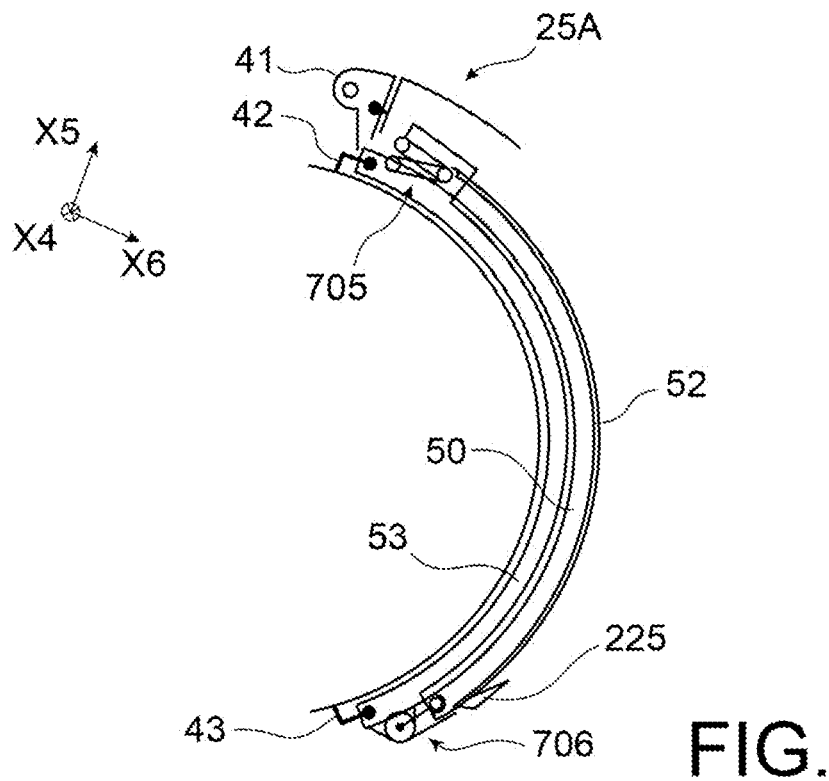
FIG. 25 is a schematic view of a half-portion of the reverser of the propulsion unit of FIG. 1 according to a third embodiment, comprising a rear frame of grids, a front frame of cowl as well as two tension members connected to the grids and cooperating with the front frame of the cowl, one of the tension members comprising a compass, the other tension member comprising a lock.
Figure 26:
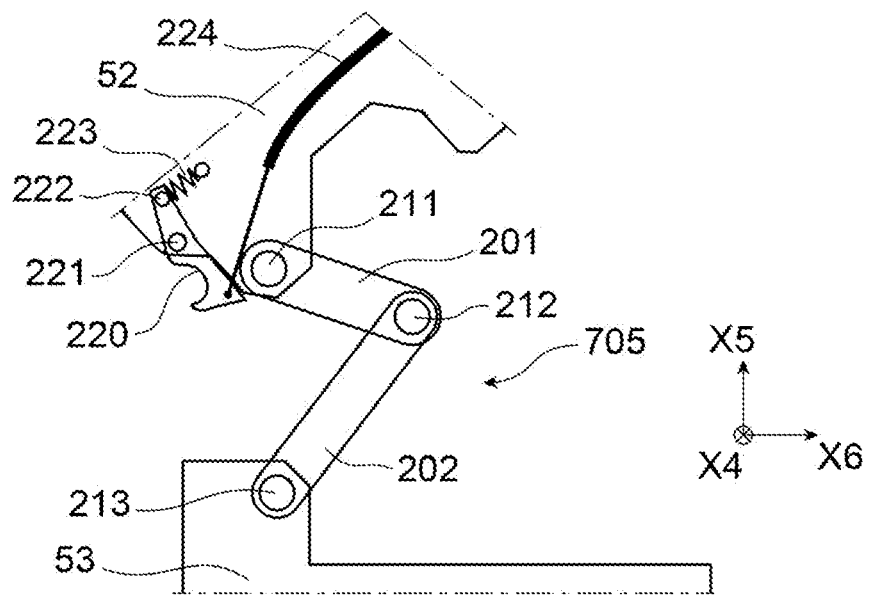
FIG. 26.
Figure 27:
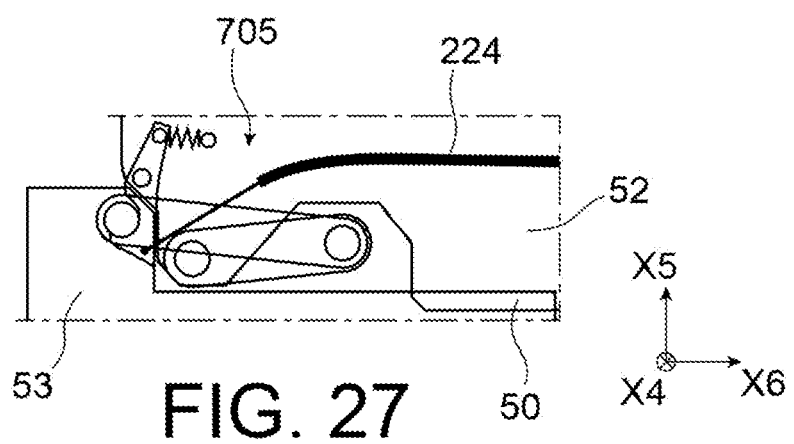
FIG. 27 are perspective partial schematic views of the half-portion of the reverser of FIG. 25, showing the compass and the cowl respectively in a first position corresponding to the maintenance configuration of FIG. 4 and in a second position corresponding to the flight configuration of FIGS. 1-3, these figures showing a mechanism allowing blocking the compass when the cowl is in the second position.

FIGS. 25 to 27 illustrate loading means which are distinguished from those described above with reference to FIGS. 8 to 24 in that tension members act directly on the front frame 52 of the cowl 31, without implementation of a force transmission part such as a tightening band.

With reference to FIG. 26, the loading means comprise a first tension member 705 formed in this example by two connecting rods 201 and 202 and three hinge elements 211, 212 and 213.

A first end of the connecting rod 201 is hinged to the front frame 52 of the cowl 31 by the hinge element 211 and a first end of the connecting rod 202 is hinged to the rear frame 53 of the grids 40 by the hinge element 213. The connecting rods 201 and 202 are hinged to each other by the second end thereof via the hinge element 212.

The connecting rods 201 and 202 thus form a compass which can pass from an open configuration illustrated in FIG. 26 when the cowl 31 is in the open position to a closed configuration illustrated in FIG. 27 when the cowl 31 is in the closed position, and reciprocally.

In order to block the compass in the closed configuration, the reverser comprises a blocking mechanism comprising a blocking member 220, two hinge elements 221 and 22 and an elastic member such as a spring 223.

The blocking member 220 is hinged to the front frame 52 of the cowl 31 by the hinge element 221 and comprises one end forming a hook configured to cooperate with the hinge element 213 secured to the rear frame 53 of the grids 40.

The spring 223 is connected to the blocking member 220 by the hinge element 222 so as to exert a blocking force on the blocking member 220 tending to make it pivot in a first direction of rotation around the hinge element 221.

The blocking member 220 is configured such that, when the cowl 31 is displaced from the open position (FIG. 26) to the closed position (FIG. 27), the blocking member 220 bears on the hinge element 213 so as to pivot in a second direction of rotation around the hinge element 221 and thus allow the engagement of the hook around the hinge element 213. The blocking force exerted by the spring 223 allows blocking the compass in the closed configuration.

In order to be able to disengage the blocking member 220 relative to the hinge element 213 and then open the cowl 31, the reverser is equipped with a control mechanism comprising, in this example, a cable 224 and an actuating handle 225.

A first end of the cable 224 is connected to the blocking member 220 such that a pull of this cable 224, with a force greater than that produced by the spring 223, causes the blocking member 220 to pivot in the second direction of rotation around the hinge element 221.

The actuating handle 225 is connected to the second end of the cable 224 and mounted at the second circumferential end of the front frame 52 of the cowl 31.

In the embodiment of FIG. 25, the loading means also comprise a lock 706 forming a second tension member.

The lock 706 comprises a first portion secured to the second end of the front frame 52 of the cowl 31 and a second portion secured to the rear frame 53 of the grids 40. Analogously to the lock 702 described above with reference to FIGS. 14 and 15, the first portion of the lock 706 comprises a first attachment element forming a hook intended to cooperate with a second attachment element such as a cylinder forming the second portion of this lock 706.

From the configuration of FIG. 27 in which the cowl 31 is in the closed position, the locking of the lock 706 results in the application of a circumferential stress by the tension members 705 and 706 on the front frame 52 of the cowl 31, which generates said stress pressing the tab 57 into the groove 58.

Of course, the above description is not limiting and many variants may be made to these different embodiments without departing from the scope of the invention. For example, the connecting means 50 can comprise one or more tabs formed by the grids 40 and one or more corresponding grooves formed by the front frame 52 of each of the cowls 31 (not represented).

In addition, the above description applies by analogy to a reverser with movable grids having a "C" architecture, well known in the aeronautical field, in which the outer cowls of the rear section 17 open in the maintenance position independently of the portions of this section forming the secondary conduit 21N (not represented).

What is claimed is:

1. A thrust reverser for an aircraft propulsion unit, comprising a fixed portion, two cowls and deflection grids, each of the cowls being connected to the fixed portion according to a pivot connection so as to be able to be displaced between a closed position and an open position intended for the maintenance of the propulsion unit, the reverser comprising connecting means comprising one or several tabs formed by the cowls or respectively by the grids and at least one groove formed by the grids or respectively by the cowls, the connecting means being configured such that the tab(s) fit into the at least one groove when the cowls are displaced from the open position to the closed position such that, in the closed position, the cowls and the grids form a coupling which is movable relative to the fixed portion in translation along a longitudinal axis between an advanced position allowing the propulsion unit to generate a thrust and a retracted position allowing the propulsion unit to generate a counter-thrust, the coupling comprising tension members connected to the grids and being configured so as to exert a stress pressing the tab(s) into the at least one groove.

2. The reverser according to claim 1, wherein the tension members are configured to cooperate with the cowls and/or with one or more force transmission parts.

3. The reverser according to claim 1, wherein the cowls comprise a frame forming the tab(s), or respectively the at least one groove, the tension members being configured to cooperate with the frame of the cowls or with one or more force transmission parts carried by the frame of the cowls.

4. The reverser according to claim 1, wherein the tension members comprise at least one lock and/or at least one compass comprising at least two connecting rods hinged to each other, one of the connecting rods being connected to the grids, the other connecting rod being connected to one of the cowls.

5. The reverser according to claim 1, wherein a compass comprising at least two connecting rods hinged to each other is configured to take a first configuration when the cowls are in the closed position and a second configuration when the cowls are in the open position, the reverser comprising a blocking member allowing blocking the compass in the first configuration and a control mechanism allowing unblocking the compass to be able to place the compass in the second configuration.

6. The reverser according to claim 1, comprising one or more tightening bands forming one or more force transmission parts configured to cooperate with the tension members, each of the tightening bands extending radially outside the connecting means and circumferentially about the longitudinal axis, each of the tightening bands comprising two circumferential ends which are each configured to be connected to the grids by a respective one of the tension members such that the tension members can exert a circumferential stress on the tightening bands.

7. The reverser according to claim 6, wherein the tension members comprise at least one lock and/or at least one compass comprising at least two connecting rods hinged to each other, one of the connecting rods being connected to the grids, the other connecting rod being connected to one of the cowls, and wherein at least one of the circumferential ends of at least one of said tightening bands is connected to said lock.

8. The reverser according to claim 6, wherein the tension members comprise at least one lock and/or at least one compass comprising at least two connecting rods hinged to each other, one of the connecting rods being connected to the grids, the other connecting rod being connected to one of the cowls, and wherein at least one of the circumferential ends of at least one of said tightening bands is connected to said compass so as to preserve the connection between this tightening band and the grids when the cowls are displaced between the open and closed positions.

9. The reverser according to claim 6, wherein the tightening bands comprise primary tightening bands and secondary tightening bands configured such that the pressing stress is exerted by the primary tightening bands when these are operational and by the secondary tightening bands in the case of breakage or failure of the primary tightening bands.

10. A method for attaching the tabs to the at least one groove of the reverser according to claim 1, the method comprising a step of pressing the tabs into the at least one groove.

\* \* \* \* \*